Jan. 12, 1960      C. W. SHANE      2,920,829

HEATER FOR VEHICLES

Filed Aug. 13, 1956

INVENTOR.
Charles W. Shane
BY
ATTORNEY.

United States Patent Office 2,920,829
Patented Jan. 12, 1960

2,920,829

HEATER FOR VEHICLES

Charles W. Shane, Muncie, Kans.

Application August 13, 1956, Serial No. 603,764

1 Claim. (Cl. 237—12.3)

This invention relates to vehicular heating equipment and more particularly to such equipment adapted for heating the operator's station of a vehicle in the nature of tractors or the like.

Many of the tractors and heavy road equipment utilized today have an operator's station which is open to the elements and completely unprotected so that the person operating the machine is exposed to all changes in the weather. This problem presents particular difficulties in those areas where extremely cold temperatures are experienced in the winter months. Thus, there has existed a great need for providing means to heat the area of a tractor or heavy road equipment in which the operator is stationed during operation of the equipment.

It is, therefore, the most important object of this invention to provide a heater for vehicles which is relatively inexpensive and which may be detachably mounted on such vehicle in a manner to convey heated currents of air to the operator's station.

An equally important object is to provide a heater for vehicles which includes a hood adapted for disposition over the radiator forming a part of the vehicle in a manner to collect heated currents of air produced by a fan on the vehicle which directs artificial currents outwardly through the radiator.

A further important object of this invention is to provide a heater for vehicles as above set forth in which the hood is formed of flexible material such as canvas or the like so as to be easily assembled and may be economically produced by fabrication of pre-cut components which are joined in a suitable manner to form a box-like member adapted for releasable attachment over the radiator hood of a tractor or the like.

Other important objects of this invention include the provision of a vehicular heater in which there is attached to the uppermost end thereof a flexible conduit for conveying heated currents of air to the operator's station at the rear of the vehicle; heating equipment as referred to above in which the hood is detachably mounted on the radiator hood of the tractor by a drawstring or the like; and other objects and details of construction which will become obvious or described more fully as the following specification progresses.

Figure 1:
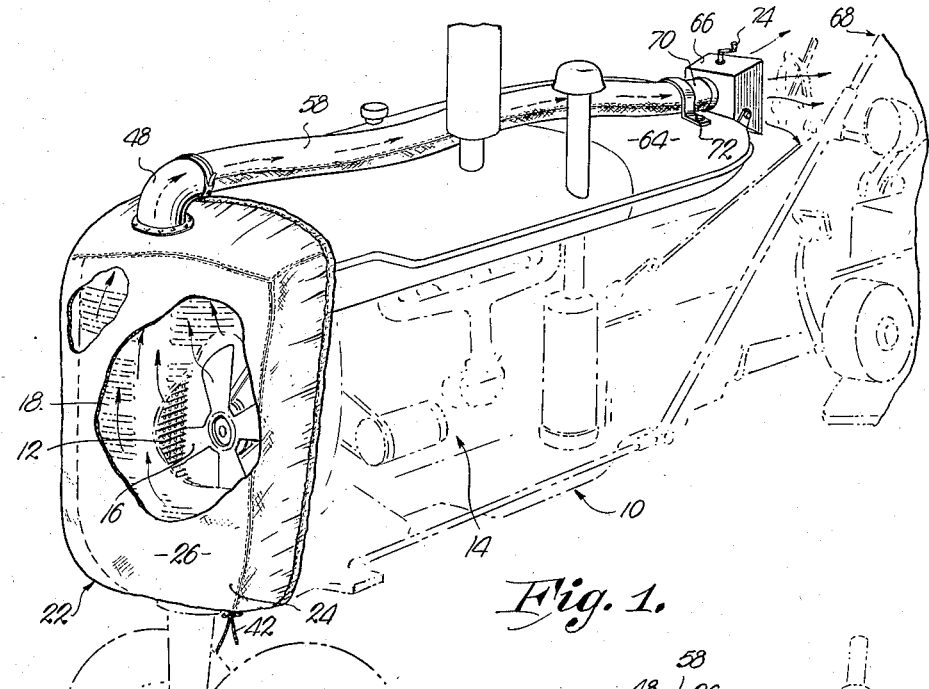
Figure 1 is a fragmentary, perspective view of a tractor having an embodiment of the present invention mounted thereon, certain component parts being shown in phantom and others being broken away to show details of construction.

A tractor upon which the instant invention is adapted to be mounted is shown fragmentarily and perspectively in Fig. 1 of the drawing and is designated generally therein by the numeral 10.

Tractor 10 is conventionally provided with an upright radiator 12 which forms a part of the cooling system for engine 14 and in this respect, it can be appreciated that when engine 14 is running, a fluid such as water which is heated within engine 14, circulates through radiator 12, and in this manner is cooled by passage of air through radiator 12.

According to the concepts of the instant invention, tractor 10 is provided with a fan 16 which is connected to the crank shaft of the engine and adapted to direct currents of air from the open sides of tractor 10 forwardly and outwardly through radiator 12 and grill 18 which forms a part of the radiator hood 20 of tractor 10. It is to be noted at this point that fan 16 has blades disposed in a manner so as to direct the currents of air forwardly and thus outwardly through radiator 12 rather than in the more conventional manner of pulling air in through radiator 12. Inasmuch as the sides of tractor 10 are open, movement of air therefrom to radiator 12 is substantially unimpeded.

Figure 2:
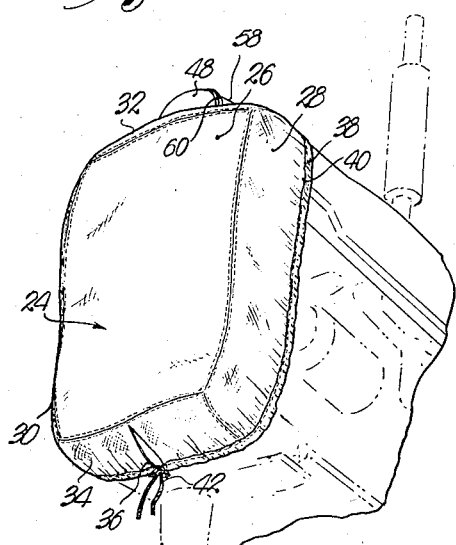
Fig. 2 is a fragmentary, perspective view of a heater made according to the concepts of the instant invention and showing the same mounted on the radiator of a tractor.

A vehicle heater embodying the principles of the instant invention is designated broadly in the drawing by the numeral 22 and preferably comprises an elongated hood 24 which is formed of a rectangular panel 26 and a pair of side flaps 28 and 30, a top flap 32, and a bottom flap 34 which are attached to corresponding edges of panel 26 by any suitable means such as lines of stitching or the like. Panel 26 is substantially coextensive in length and width with radiator hood 20. From Fig. 2 of the drawing it can also be ascertained that adjacent edges of flaps 28, 30, 32 and 34 are joined by lines of stitching. Thus, there is presented a box-like hood 24 which is adapted to be placed over the radiator hood 20 of tractor 10.

A slit 36 is provided in bottom flap 34 and extends inwardly from the outermost marginal edge thereof toward panel 26. As is clearly apparent in Fig. 3 of the drawing, the outermost marginal edges of all of the flaps 28, 30, 32 and 34 are folded over to form a hem 38 which is secured to the flaps by a line of stitching 40. Threaded throughout the entire length of hem 38 around hood 24 and extending beyond the open ends thereof formed by slit 36, is a take-up cord 42.

Thus, hood 24 is adapted for disposition over the outermost portion of tractor hood 20 and because of the provision of take-up cord 42, the outermost peripheral edge of hood 24 can be brought into frictional engagement with tractor hood 20. When hood 24 is thus disposed in its attached position, it is preferable that panel 26 be disposed in spaced relationship to grill 18 so as to provide a hot air receiving chamber 44.

Hood 24 may be constructed of canvas material or the like to render the same more easily producible and more economical, but it is manifest that many other types of materials, even including metal, may be utilized.

Figure 3:
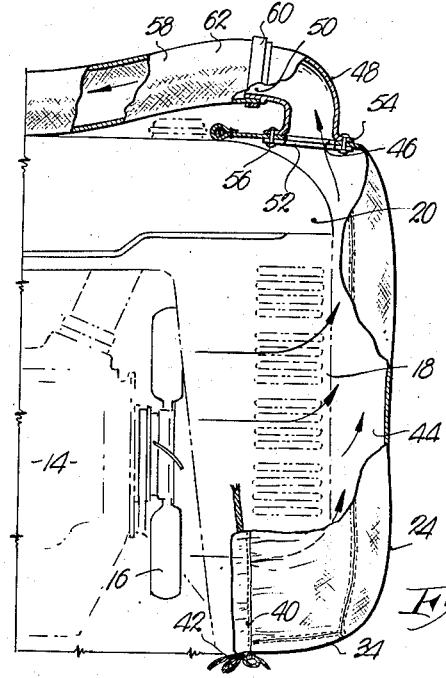
Fig. 3 is an enlarged, fragmentary, side elevational view of a hood mounted on a tractor, certain parts being broken away and in section for clarity of illustration.

An opening 46 is provided in top flap 32 and is most conveniently located substantially equidistantly from side flaps 28 and 30 and from panel 26 and the outermost marginal edge of hood 24. Secured to top flap 32 in circumscribing relationship to opening 46, is an elbow fitting 48 and which includes an outlet port 50 which is preferably disposed in a manner to direct air rearwardly of tractor 10 when hood 24 is mounted thereon. Elbow 48 may be attached to hood 24 in any suitable way but a convenient connection is illustrated in Fig. 3 wherein it can be seen that there is provided an annulus 52 beneath the under side of top flap 32 and which is secured to the flange 54 of elbow 48 by rivets or screws 56.

Releasably attached to the outlet port 50 of elbow 48 is an elongated, flexible conduit 56 which can be secured to elbow 48 by a coupler 60 which renders the end 62 of conduit 58 quickly and easily attachable and detachable to hood 24.

Mounted on the gas tank 64 of tractor 10 is a distribution outlet 66 which has an opening disposed to distribute currents of hot air to all portions of the operator's station designated broadly by the numeral 68. The end 70 of conduit 58 is releasably attached to and in communication with distribution outlet 66 and in addition end 70 is releasably held in position by a bracket 72 on tank 64.

Distribution outlet 66 preferably has a damper therein (not shown) which is controlled by a rotatable knob 74 in a manner so that the operator of the tractor 10 may close conduit 58 at will.

It is now manifest that when the operator of tractor 10 starts engine 14, hot water or the like is circulated through radiator 12, and fan 16 directs artificial currents of air forwardly and outwardly through radiator 12 to thereby heat the air. Such heated air is collected in chamber 44 where the same is then directed through elbow 48 and conveyed to distribution outlet 66 by conduit 58.

It is to be noted that other types of outlets may be employed in lieu of distribution outlet 66 and it can be further appreciated that conduit 58 may be constructed of longer length than illustrated in Fig. 1 of the drawing so as to be disposable in any desired position by the operator of tractor 10. Also because of the provision of a flexible conduit 58, it is manifest that heater 22 may be disposed on any type of tractor or other heavy road equipment. By the same token, the heater 22 may be quickly and easily removed from tractor 10 when the weather conditions warrant such removal, but heater 22 may again be replaced in a very short time when the need arises.

Having thus described the invention what is claimed as new and desired to be secured by Letters Patent is:

In heating equipment for a tractor-like vehicle having an exposed rearwardly disposed operator's station, an upright radiator forwardly of said station through which is circulated a heated fluid, and a fan for directing artificial currents of air forwardly and outwardly through the radiator in a forward direction away from said station to thereby heat said currents of air, the improvement which comprises a flexible hood adapted to be removably attached to the vehicle externally of the latter in an upright position in enveloping relationship to the front and outermost portions of the radiator and including a rectangular end panel substantially coextensive in length and width with the radiator disposed in forwardly spaced relation to the latter, a pair of relatively narrow, rearwardly extending side flaps, a relatively narrow, rearwardly extending top flap having an outlet opening therein, and a relatively narrow, rearwardly extending bottom flap attached to corresponding edges of the end panel, adjacent edges of the flaps being interconnected to present a box-like hood; a drawstring in the rearmost marginal edges of top, bottom and side flaps respectively whereby the hood may be removably placed over the radiator with the end panel supported in said forwardly spaced relationship to the former and said rearmost marginal edges of the flaps being drawn up into frictional engagement with the radiator to hold the hood in place over the same and collect the heated air directed forwardly therefrom; a fitting mounted on said top flap in communication with said outlet opening; a distribution outlet fixture; a flexible conduit external to said vehicle interconnecting said fixture with said fitting; and means for removably mounting said fixture proximate said station for directing heated air into the latter.

References Cited in the file of this patent

UNITED STATES PATENTS

| | | |
|---|---|---|
| 1,896,068 | Butterfield | Feb. 7, 1933 |
| 1,968,522 | Jaffee | July 31, 1934 |
| 2,002,626 | Brennan | May 28, 1935 |
| 2,124,925 | McNeal | July 26, 1938 |
| 2,417,636 | Ditzler et al. | Mar. 18, 1947 |

FOREIGN PATENTS

| | | |
|---|---|---|
| 959,295 | France | Mar. 27, 1950 |
| 710,698 | Germany | Sept. 19, 1941 |
| 447,055 | Great Britain | May 6, 1936 |